(12) United States Patent
Cideciyan et al.

(10) Patent No.: US 8,976,479 B2
(45) Date of Patent: Mar. 10, 2015

(54) WRITING DATA TO TAPE STORAGE MEDIUM

(75) Inventors: Roy D. Cideciyan, Rueschlikon (CH); Simeon Furrer, Altdorf (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/110,983

(22) PCT Filed: Apr. 24, 2012

(86) PCT No.: PCT/IB2012/052045
§ 371 (c)(1),
(2), (4) Date: Oct. 10, 2013

(87) PCT Pub. No.: WO2012/156840
PCT Pub. Date: Nov. 22, 2012

(65) Prior Publication Data
US 2014/0036383 A1  Feb. 6, 2014

(30) Foreign Application Priority Data
May 13, 2011 (EP) .................................. 11166083

(51) Int. Cl.
*G11B 5/09* (2006.01)
*G11B 5/008* (2006.01)
(52) U.S. Cl.
CPC .................................. *G11B 5/00813* (2013.01)
USPC ......... 360/55; 360/77.12; 360/78.02; 360/83; 360/90

(58) Field of Classification Search
None
See application file for complete search history.

(56) References Cited

U.S. PATENT DOCUMENTS

| | | | |
|---|---|---|---|
| 6,206,313 B1 | 3/2001 | Rudi | |
| 6,278,569 B1 * | 8/2001 | Fukuda | .......................... 360/64 |
| 7,227,721 B1 | 6/2007 | Kientz | |
| 7,440,212 B2 | 10/2008 | Saliba | |
| 2008/0244171 A1 | 10/2008 | Ashton | |
| 2009/0109571 A1 | 4/2009 | Hood et al. | |
| 2010/0053801 A1 * | 3/2010 | Katagiri et al. | ............. 360/77.12 |
| 2011/0019304 A1 | 1/2011 | Heineman et al. | |

FOREIGN PATENT DOCUMENTS

| | | |
|---|---|---|
| CN | 1144958 A | 3/1997 |
| CN | 1560850 A | 1/2005 |
| EP | 0579411 A2 | 1/1995 |

* cited by examiner

*Primary Examiner* — Muhammad N Edun
(74) *Attorney, Agent, or Firm* — Jeff Tang

(57) ABSTRACT

A method for writing data to a tape storage medium includes: writing first user data to a first physical region (11) of the tape storage medium (1) in a first write mode, writing second user data to a second physical region (12) of the tape storage medium (1) in a second write mode, wherein the second write mode differs from the first write mode. An apparatus for writing data to a tape storage medium, a tape storage medium, a tape cartridge are also provided.

20 Claims, 4 Drawing Sheets

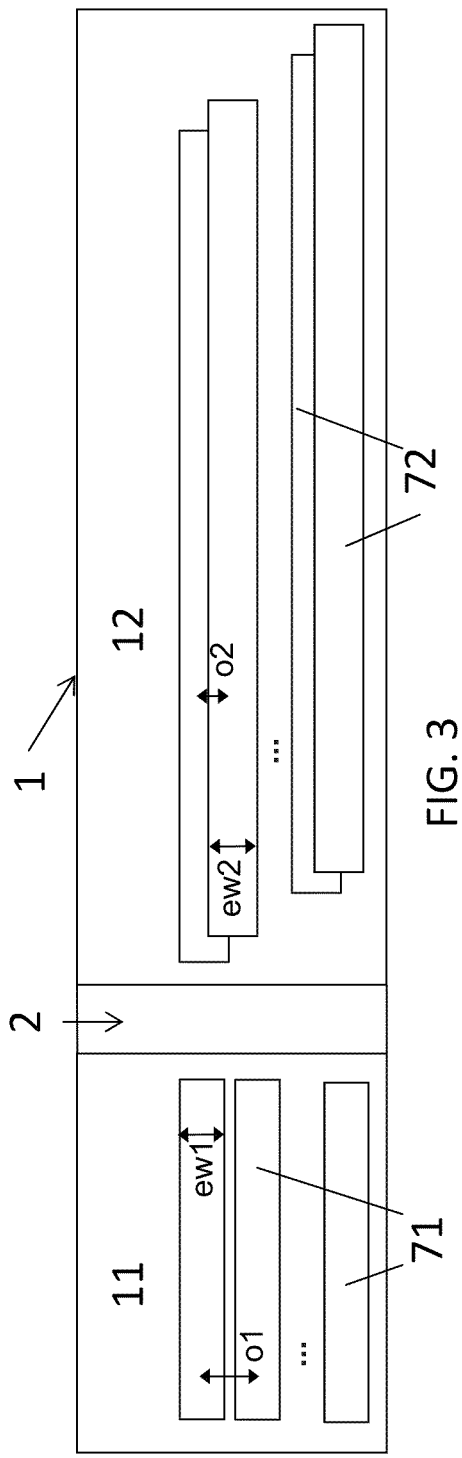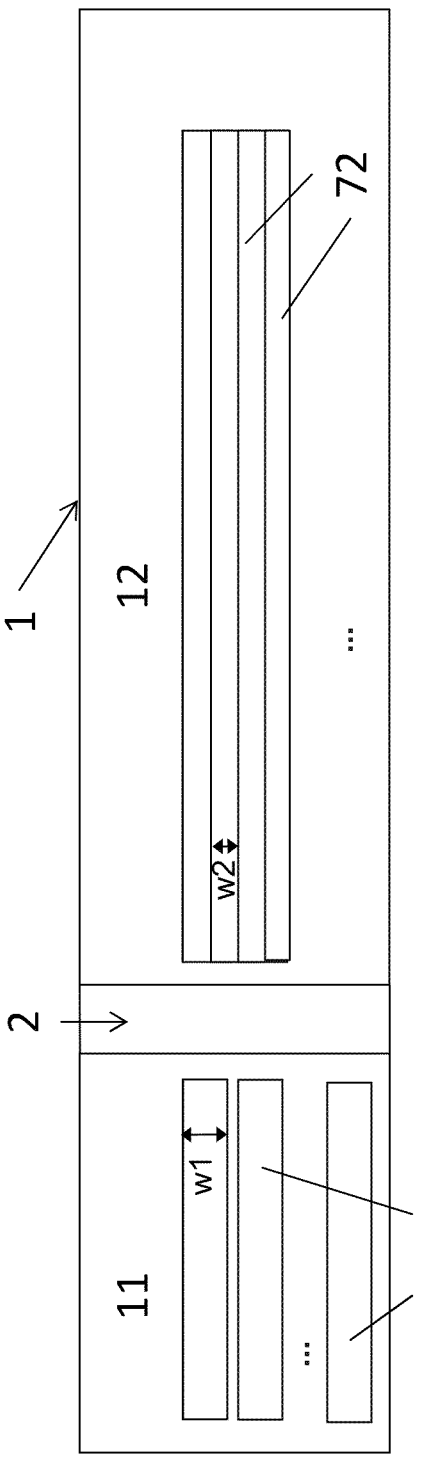
FIG. 3
FIG. 4

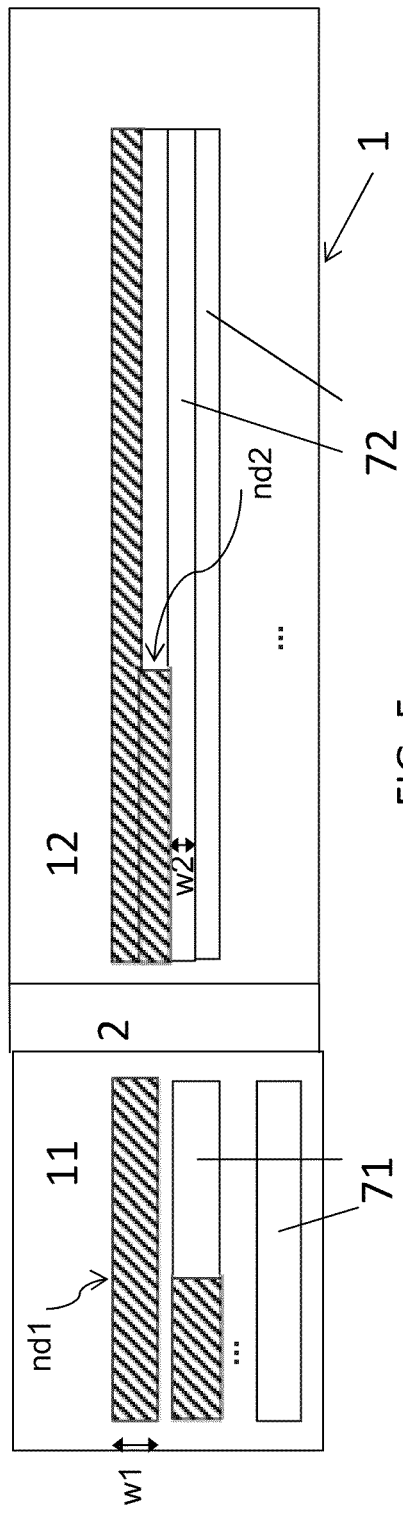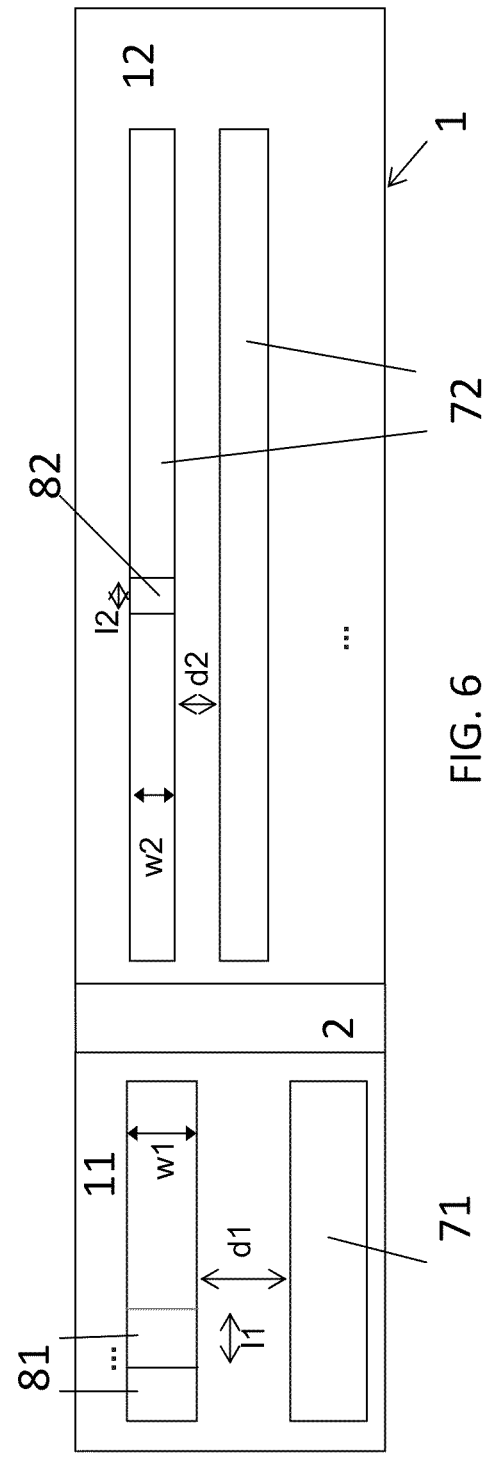

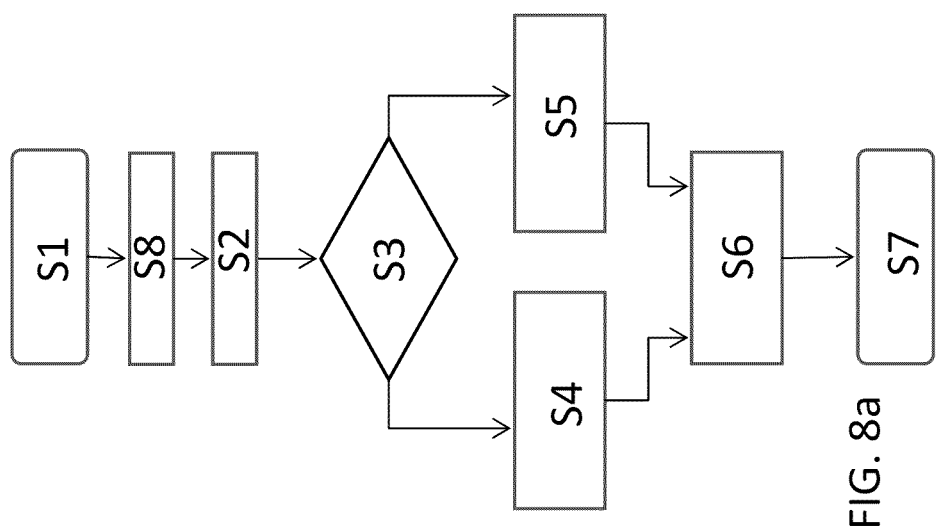
FIG. 8b
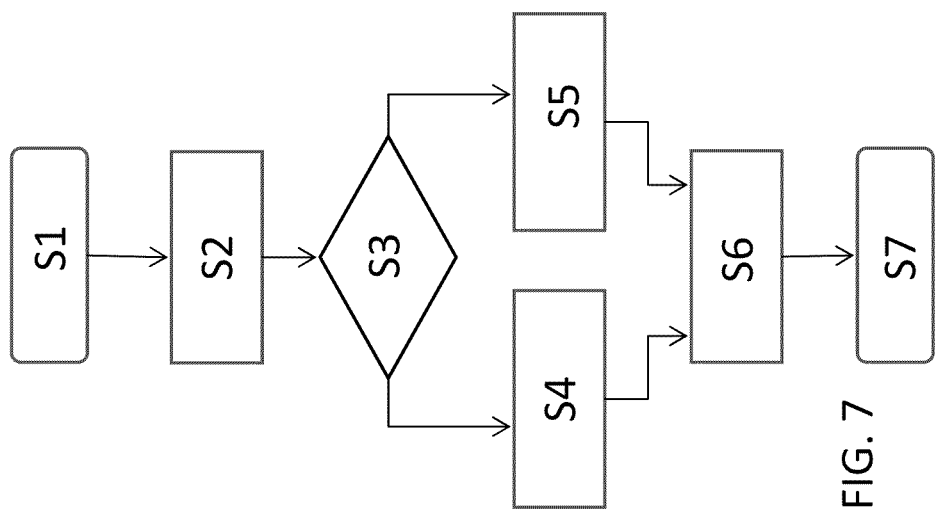
FIG. 8a
FIG. 7

WRITING DATA TO TAPE STORAGE MEDIUM

CROSS-REFERENCE TO RELATED APPLICATIONS

This application claims priority under 35 U.S.C. §371 from PCT Application, PCT/IB2012/052045, filed on Apr. 24, 2012, which claims priority from European Patent Application No. 11166083.3 filed on May 13, 2011, the entire contents of both applications are incorporated herein by reference.

FIELD OF THE INVENTION

The present invention relates to a tape storage medium and to a method for writing data to a tape storage medium.

BACKGROUND

In tape storage systems, data is streamed to a tape storage medium of a tape cartridge at very high speeds such as at 140 Mbyte/s in LTO-5 (Linear Tape Open) tape drives. Typically, data is written to the tape storage medium in a one-dimensional manner, i.e. in a single logical track, although the single logical track extends on the tape storage medium in two dimensions comprising multiple physical tracks arranged next to each other such that the single logical track extends back and forth along the length of the tape storage medium in a serpentine manner on the multiple physical tracks. This results in new data being written to the logical track in an append mode, i.e. new data is appended at the end of data written so far to the logical track. In other words, new data is appended to the logical end of the cartridge. All data that is ahead of the logical end of the cartridge is considered as invalid data.

Each new generation of tape storage systems may offer an increased storage capacity along with other new features. However, in order to allow for users to make use of earlier generation tape cartridges, new generation tape storage systems may provide for compatibility with respect to older generation tape cartridges in terms of reading and/or writing.

BRIEF SUMMARY OF THE INVENTION

According to an embodiment of one aspect of the invention, a method is provided for writing data to a tape storage medium. First user data is written to a first physical region of the tape storage medium in a first write mode. Second user data is written to a second physical region of the tape storage medium in a second write mode. The second write mode differs from the first write mode.

In embodiments, the method may comprise one or more of the following features:
- the second write mode differs from the first write mode in the way in which a data stream to be written to the respective physical region is generated from the respective user data;
- the second write mode differs from the first write mode in the way a data stream generated from the respective user data is written to the respective physical region;
- the first write mode generates first data tracks with a first width on the tape storage medium, the second write mode generates second data tracks with a second width on the tape storage medium, and the first width is different from the second width;
- the first write mode writes adjacent first data tracks with a first lateral offset of a write element, the second write mode writes adjacent second data tracks with a second lateral offset of the write element, and the first lateral offset is different from the second lateral offset;
- the first write mode writes a new first data track next to an adjacent first data track without overlapping the adjacent first data track, and the second write mode writes a new second data track next to an adjacent second data track with the new second data track overlapping the adjacent second data track;
- the first write mode appends new first user data to existing first user data, and the second write mode overwrites existing second user data by new second user data;
- the first write mode arranges adjacent first data tracks on the tape storage medium at a first lateral distance, the second write mode arranges adjacent second data tracks on the tape storage medium at a second lateral distance, and the first lateral distance is different from the second lateral distance;
- the first write mode writes a logical value of the first user data by applying a write pulse with a first length, the second write mode writes a logical value of the second user data by applying a write pulse with a second length, and the first length is different from the second length;
- in the first write mode at least one of a modulation, compression, encryption, run-length limited coding and error correction coding is applied for generating a data stream to be written to the first physical region from the first user data which is different from a respective modulation, compression, encryption, run-length limited coding and error correction coding applied for generating a data stream to be written to the second physical region from the second user data.

According to an embodiment of another aspect of the present invention, a computer program product is provided comprising a computer readable medium having computer readable program code embodied therewith, the computer readable program code comprising computer readable program code configured to perform a method according to any one of the preceding embodiments.

According to an embodiment of another aspect of the present invention, an apparatus is provided for writing data to a tape storage medium. A controller of the apparatus is adapted to execute the steps of the method as claimed in any one of the preceding embodiments.

According to an embodiment of another aspect of the present invention, a tape storage medium is provided comprising at least two physical regions for storing data written according to a method of any one of the preceding embodiments.

According to an embodiment of another aspect of the present invention, a tape storage medium is provided comprising a first physical region comprising first data in a first data format and a second physical region comprising second data in a second data format, wherein the second format differs from the first format.

In embodiments, any tape storage medium may comprise one or more of the following features:
- the second data format differs from the first data format in the way in which a data stream written to the respective physical region is generated from respective user data;
- the second data format differs from the first data format in the way a data stream generated from respective user data is written to the respective physical region;

a separator between two adjacent ones of the physical regions, wherein the separator is one of a guard region, a region header and a data pad.

According to a further embodiment of the present invention, a tape cartridge is provided comprising a tape storage medium according to any one of the previous embodiments.

It is understood that method steps may be executed in a different order than listed in a method claim. Such different order shall also be included in the scope of such claim as is the order of steps as presently listed.

Embodiments described in relation to the aspect of a method shall also be considered as embodiments disclosed in connection with any of the other categories such as the tape storage medium, the apparatus, the computer program product, etc, and vice versa.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

The figures are illustrating in.

DETAILED DESCRIPTION OF THE EMBODIMENTS

Figure 1:
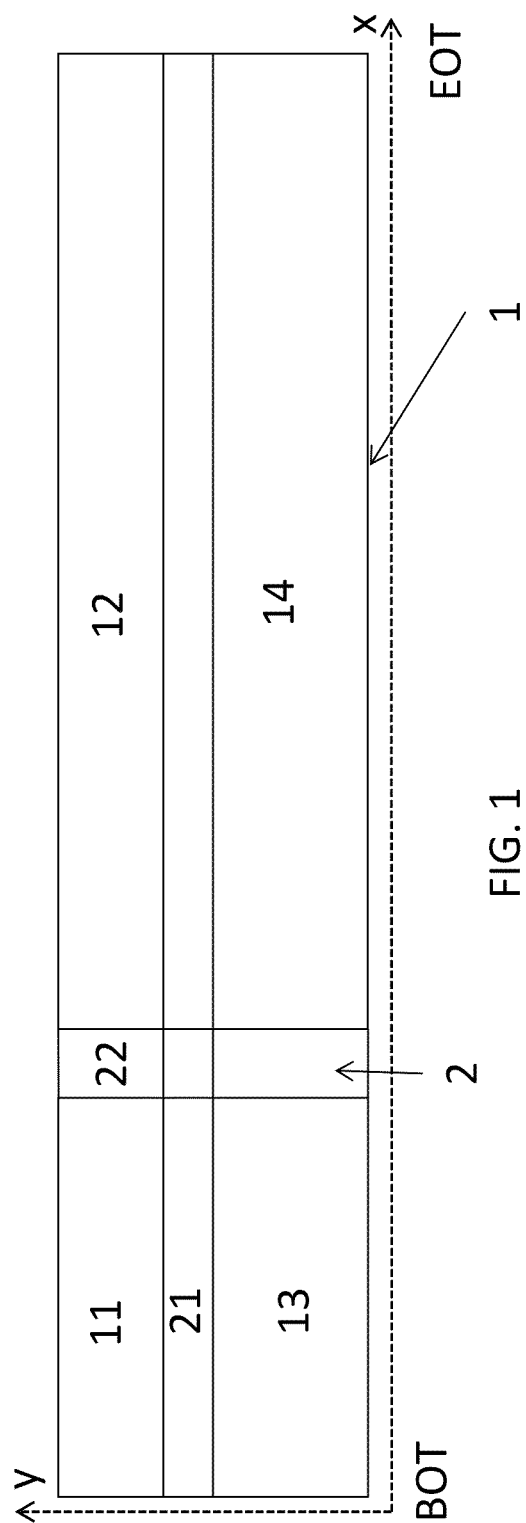
FIG. 1 a schematic diagram of a tape storage medium according to an embodiment of the present invention, FIG. 2 a block diagram of a storage system according to an embodiment of the present invention, FIG. 3-FIG. 6 schematic diagrams of tape storage mediums according to embodiments of the present invention, and FIG. 7-FIG. 8 flow diagrams illustrating methods according to embodiments of the present invention.

As an introduction to the following description, it is first pointed at a general aspect of the invention, concerning a method for writing data to a tape storage medium, wherein first user data is written to a first physical region of the tape storage medium in a first write mode and second user data is written to a second physical region of the tape storage medium in a second write mode. The second write mode differs from the first write mode in preferably at least one parameter.

Such method may be implemented in a controller for controlling actions on a tape cartridge inserted into a tape drive, which tape cartridge includes the tape storage medium. The controller may be part of an individual tape drive and may inter alia be in charge for write and read operations on/from the tape storage medium. In another embodiment, a tape storage system may comprise multiple tape drives and possibly a tape library, wherein the controller may be in charge for controlling operations with respect to multiple tape drives of the tape storage system, and possibly with respect to the tape library if present.

The tape storage medium may preferably be a tape comprising magnetic material such as metal particle (MP) or Barium ferrite (BaFe) which preferably is deposited on a substrate such as one of Polyethylene terephthalate (PET), Polyethylene naphthalate (PEN) or Polyamid (PA). The tape may be wound on reels in a tape cartridge.

The user data may comprise any data to be stored or archived on the tape storage medium. Specifically, the user data may be data to be stored on the tape storage medium upon request by a host. The host may be in communication with the tape drive envisaged for holding a tape cartridge for writing data to and reading data from. Or, the host may be in communication with a tape storage system, the tape storage system comprising multiple tape drives and, possibly, a tape library. The host may be any computing entity allowing to initiate write and/or read requests to the tape storage system.

Specifically, the user data may exclude metadata, i.e. data supporting or describing properties of user data, and may exclude control data for controlling operations on the tape storage medium, i.e. specifically for controlling one or more of reading, writing, erasing, or rewriting of user data on the tape storage medium. Such control data may also include, for example, servo data stored on the tape storage medium and used for preventing the read/write head from laterally deviating from track centerlines. In the present context, first user data generally is denoted as user data assigned to the first physical region, and second user data is denoted as user data assigned to the second physical region. The first used data may contain user data identical to the second user data in case of the two physical regions being interpreted as data mirror. However, the first user data may contain user data different to the second user data. The user data may comprise any multiple of a smallest logical value such as a bit.

The tape storage medium may comprise two or more physical regions. A physical region may be understood as a contiguous, two-dimensional region on the tape storage medium to which data is written in a uniform mode of writing. Writing in a uniform mode preferably includes writing by applying the same write parameters such as modulation, compression, encryption, run-length limited coding, error correction coding, width and length of cells, data track width, distance between adjacent data tracks and others. In this context, a data track is rather understood as a physical data track containing a linear path on the tape storage medium from the beginning of a physical region to the end of a physical region in which data is stored consecutively in a direction defined by a relative movement between the tape storage medium and the one or more write heads. Although logically a physical region may comprise a single data track for the reason that adjacent physical data tracks are written and read in a serpentine manner by means of reversing the direction of the relative movement between the head and the tape storage medium, from a physical perspective a track is understood as a physical path in a physical region of the tape storage medium between two longitudinal positions where no change in the direction of the relative movement between the head and the tape storage medium is required for reading or writing data from/to such physical data track. As a result, a physical data track may only hold a subset of data residing in the corresponding logical track of a specific physical region. In such context, a physical region may comprise multiple physical data tracks extending in parallel between a first and a second longitudinal position of the tape storage medium. A cell is understood as an entity in which a single logical data value may be stored. A data value may be a binary value, a ternary value, etc subject to the modulation used. In such sense, a data track may contain multiple cells arranged in a row on the data track.

A physical region preferably may be separated from one or more other physical regions on the tape storage medium by means of a guard region. A guard region may be detected by the controller as an identifier for a transition from a first physical region to a second physical region. In such sense, a guard region may follow a convention, and may, for example, include one or more of a region coded in a special way, a non-coded region, etc.

In response to detecting a guard region, the controller in charge for writing data to a next physical region may switch from a writing mode previously applied to a different writing mode to be applied for writing data to the upcoming physical region. In this context, a guard region may exemplary provide information in coded form as to which write mode to apply for a subsequent or an adjacent physical region. In the same context, when reading data from the tape storage medium, the tape drive controller in charge for reading data may switch from a reading mode presently applied to a different reading mode to be applied for reading data from a subsequent physical region. In this context, a guard region may provide information in coded form as to which read mode to apply for a subsequent physical region.

A tape storage medium may comprise two or more physical regions separated by longitudinal guard regions. In such embodiment, the physical regions may comprise a longitudinal extension equivalent to the entire tape length. A lateral extension of the tape is separated into the two or more physical regions. In another embodiment, the tape storage medium may comprise two or more physical regions separated by lateral guard regions. In such embodiment, each physical region may comprise a longitudinal extension less than the tape length but each physical region may cover the entire width of the tape. In another embodiment, a tape storage medium may comprise at least four physical regions wherein each region is characterized by a length less than the tape length and a width less than the tape width. Such physical regions may take the shape of rectangles spread over the tape storage medium wherein the physical regions are laterally and longitudinally separated by guard regions.

Taking a different view, first data may be written to a first physical region of the tape storage medium in a first data format, and second data may be written to a second physical region of the tape storage medium in a second data format. The second data format differs from the first data format. A data format may include any write convention/write mode defined for writing data to a tape storage medium, i.e. a combination of write parameters to be applied for writing data, and specifically user data. A data format may include and/or reflect write parameters such as a degree of shingling, a number of wraps, capacity, areal density, latency, data integrity, insert mode such as append or overwrite, etc. Such write parameters may define a write mode and as a result of the write mode may define a data format in its physical expression which is understood as the way how and where a data stream generated from the user data is written to the associated physical region. A data format may differ from another data format in at least one of these write parameters. A data format may also include and/or reflect write parameters such as modulation, compression, encryption, run-length limited coding, error correction coding, etc. Such write parameters may define a write mode and as a result of the write mode may define a data format in its logical expression which is understood as the way how a data stream to be written to the physical region is generated from the user data. A data format may differ from another data format in at least one of these write parameters. In another embodiment, a write mode and a data format as a result of a write mode may result in/include both a data format in its logical expression and a data format in its physical expression In another embodiment, a data format may be defined as a combination of such write parameters as defined in a specification. An example for a specification may be any version of the Linear Tape Open (LTO) specification. Here, an exemplary first data format applied to a first physical region may include data written according to the convention of LTO-5 while a second data format may include data written according to a different convention, such as to the convention of LTO-4, for example.

Therefore, the present idea enables writing data of different classes to the same tape cartridge, and specifically to the same tape storage medium in such tape cartridge. Such classes of data may comprise data with different requirements as to latency, error correction coding capability, data integrity and access patterns ("hot" data vs. "cold" data). Embodiments of the invention provide a multi-tier storage on a single tape cartridge for the reason that, for example, by providing different physical regions with different write formats different access times may be achieved in reading such data. User data to be written to the tape storage medium may be classified up-front, for example by the host, or, alternatively by the tape storage controller, for example with respect to frequency of usage, urgency of availability, etc. A distinction in "hot" and "cold" data may be helpful, in which "hot" data is expected to be accessed more often than "cold" data. The physical region assigned, for example, may then be a region allowing overwriting which allows a faster access compared to an append data write mode. Overwriting in turn requires data tracks written in a non-shingled way, i.e. in a non-overlapping way.

In another embodiment, the data may be classified according to importance and, for example, may be classified into more relevant and less relevant data. A separate physical region may be assigned for writing the more relevant data to, and another physical region may be assigned for writing the less relevant data to. The region assigned to the more relevant data may, for example, be characterized by one or more of a larger cell area which in turn provides a better signal-to-noise ratio (SNR) at the cost of areal density, an improved error correction coding, a redundant writing of data, etc. compared to the other physical region. Again, a multi-tier storage may be implemented in a single tape cartridge.

A tape cartridge may be designed for writing data to a first physical region and to a second physical region by applying two different write modes. In a first embodiment, the tape cartridge may be a standard tape cartridge, and it is up to the controller to "partition" the tape storage medium prior to its first use into various physical regions, possibly define guard regions, and write data to the specific regions according to its own partitioning strategy. In such embodiment, the controller keeps control data, for example, in form of a table, which control data may indicate the number of partitions/physical regions, the specific location of a physical region on the tape storage medium, write parameters assigned to each physical region, and possibly other information.

In a different embodiment, a tape cartridge, and specifically the tape storage medium in the tape cartridge is formatted yet into the various physical regions by the tape cartridge manufacturer, and guard regions may be allocated. The guard regions, or other control regions may include control data indicating the write parameters associated to a physical region. In this embodiment, the control data needed for properly writing data to and/or reading data from the respective tape storage medium may reside on the tape cartridge itself, for example in a dedicated non-volatile memory provided in the tape cartridge separate from the tape storage medium, or may preferably reside on the tape storage medium itself. The formatting and the writing of the control data onto the memory or the tape storage medium may be conducted prior to the tape cartridge being supplied to end users. In a different embodiment, which constitutes a mix between the above two embodiments, the tape partitioning may be applied by the tape drive controller and the associated control data is written to the tape cartridge by the tape drive controller and stored there. In such embodiment, a tape storage system may partition standard tape cartridges according to its own preferences which tape cartridges may be read and/or rewritten by different tape storage systems since all the control data is available on the tape cartridge itself, provided other tape storage systems are capable of switching between different write modes and are in a position to read and interpret the control data.

In embodiments, applying different write modes to different physical regions may result in user data arranged in different layouts in the different physical regions. A layout comprises an arrangement of data on the respective physical region, and specifically may include an arrangement of cells and/or data tracks.

Same or equivalent elements in the figures may be referred to by the same reference signs.

FIG. 1 illustrates a schematic diagram of a tape storage medium according to an embodiment of the present invention. The tape storage medium, in short "tape" in the following has a longitudinal extension along the x-axis, and a lateral extension along the y-axis. The illustration shall represent a fully unreeled tape in top view with BOT denoting the beginning of tape, and EOT denoting the end of tape. The 2-dim tape region in the present example includes four physical regions 11-14. Each physical region 11-14 is represented by a contiguous 2-dim region. Each physical region 11-14 is separated from each adjacent physical region 11-14 by a guard region 2. For building the guard region 2 a longitudinal guard stripe 21 and a lateral guard stripe 22 are provided. The guard region 2 may comprise one or more of headers, coded information as to the adjacent physical regions, coded information as to the overall arrangement of physical regions, no coded information at all, etc. A head, and in particular a read head of an associated tape drive may scan the tape 1 and by doing a controller receiving the data from the head may identify a guard region by its coding, for example. In such way, the controller may react to the sensing of a guard region in that, for example, for continuing writing in the present physical region, a direction in which the head is moved relative to the tape may be reversed by 180° degrees in order to continue writing or reading to/from the adjacent physical track.

Figure 2:
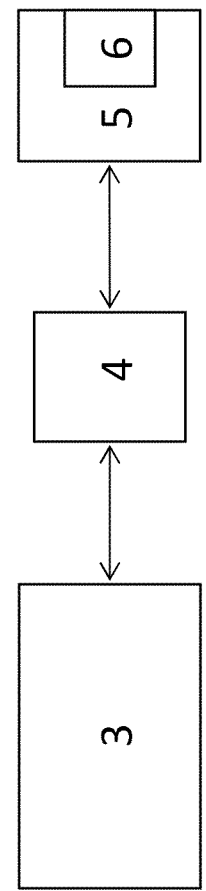

FIG. 2 illustrates a block diagram of a tape storage system according to an embodiment of the present invention. The tape storage system comprises a tape drive 5 into which a tape cartridge 6 is inserted. A controller 4 controls operations of the tape drive 5 and specifically controls reading and writing data from/to a tape storage medium residing in the tape cartridge 6. The controller 4 may be part of the tape drive 5 or may be an external entity communicating with the tape drive 5. The controller 4 is connected to an exemplary host 3 which host requests the controller 4 to store user data supplied by the host 3 in the tape storage system, and specifically on a tape storage medium in a tape cartridge 6. The data delivered by the host may be denoted as user data in the following. The user data may include arbitrary data sent by the host. As such user data typically does not include tape or tape drive control data, metadata generated by the tape storage system, or servo data for controlling the tape drive.

FIG. 3 shows a schematic diagram of a tape storage medium 1 according to an embodiment of the present invention. Similar to FIG. 1, the tape storage medium 1 is illustrated in an unreeled state in top view. The tape storage medium 1 comprises two physical regions 11 and 12 separated by a guard region 2. The first physical region 11 comprises multiple first physical data tracks 71 aligned in parallel and separated from each other by small gaps. In this context, a new first data track is written next to an adjacent data track in a non-overlapping way. The first physical data tracks 71 in combination may build a logical data track provided the first physical data tracks 71 are written and read in a predefined order, for example, in a serpentine order. Each first data track 71 has an elementary width ew1 which shall be the width of the data track 71 as defined by the width of a write element of a write head. Such write element may, when writing a new first data track next to an existing first data track, be laterally offset from a centerline of the existing data track by first offset o1 wherein o1 is equal or more than ew1. A write head may comprise multiple write elements each of which write elements is responsible for writing an associated data track.

In the second physical region 12, multiple second data tracks 72 are written next to each other. The second data tracks 72 are aligned in parallel to each other, however, adjacent second data tracks 72 are not separated by small gaps. Instead adjacent second data tracks 72 are overlapping. Specifically, a new second data track overlaps and therefore partly overwrites an existing adjacent second data track. Still, the second physical data tracks 72 in combination may build a logical second data track provided the second physical data tracks 72 are written and read in a predefined order, for example, in a serpentine order. Still, each second data track 72 has an elementary width ew2 which is identical to the elementary width ew1 of the first data tracks 71 for the reason that the elementary width shall denote the width of a data track as written by the write head and therefore corresponding to a width of the write head. In the second physical region 12, for writing a new second data track next to an adjacent second data track the write head is offset from a centerline of the existing second data track by o2 with o2 being less than o1, and specifically being less than the elementary width ew2=ew1 in order to enable writing in an overlapping way. As a result, the width w2 of second data tracks 72 is smaller than the width w1 of the first data tracks 71 as can be derived from FIG. 4.

Such overlapping write mode is also called "shingled writing". Shingled writing is applied in order to build data tracks with a width smaller than the width of the write head. Although the width of a new write head generation may technologically be reduced, this may not be desired in some tape storage systems especially when such tape storage system shall provide downwards write compatibility with respect to lower generation tape cartridges. For this reason, a write head with a width wider than actually required for writing data tracks for the current tape cartridge generation may be used in order to write data tracks of such width to a tape cartridge of a lower generation where such width tracks was state of the art.

In this context, the tape storage medium 1 of the present example as illustrated in FIGS. 3 and 4 may comprise two physical regions 11 and 12 with two different write modes applied, i.e. a shingled write mode applied to physical region 12 and a non-shingled write mode applied to physical region 11. This results in first data tracks 71 being different in width w from second data tracks 72. In a different embodiment, the first write mode not only differs from the second write mode in the shingling aspect but differs in its complete logical format. As an example, the first physical region 11 may be written according to a first tape specification, and the second physical region may be written according to a second tape specification. In a preferred embodiment, the first specification may be a first version of the Linear Tape Open (LTO) specification, such as LTO-4, and the second specification may be a different version of the Linear Tape Open (LTO) specification, such as LTO-5.

In case the write modes applied to the two or more physical regions 11 and 12 differ in the overlapping and non-overlapping write property, this may have additional consequences as is explained with respect to FIG. 5. FIG. 5 is more or less identical to FIG. 4 except that data written to the first and second data tracks 71 and 72 are illustrated by stripes. In the first physical region 11, a first one of the first data tracks 71 is completely filled with data, and a second one of the first data tracks 71 is partly filled with data. In the second physical region 12, a first one of the second data tracks 72 is completely filled with data, and a second one of the second data tracks 72 is partly filled with data. It is assumed that first new data nd1 shall be written to the first physical region 11 and that second new data nd2 shall be written to the second physical region 12. As for writing data to the second physical region 12 an overlapping write mode is applied it is not possible to overwrite existing second data in the second data tracks 72 for the reason that not only the target second data track 72 would be overwritten but also a part of an adjacent second data track 72 due to the shingling write mode and the elementary track width ew2. For this reason, new second data nd2 may preferably be appended to existing second data as is by the arrow indicated in FIG. 5. On the other hand, in the first physical region 11 first data is written in a non-shingled way such that the problem presented with respect to overwriting data in the second physical region 12 does not exist. Provided there is means for determining a longitudinal position along the tracks, new first data nd1 may replace existing first data in the striped region and the new first data may overwrite existing first data at an arbitrary position. For example, outdated data within a written first data track 71 may be overwritten by new first data replacing the outdated data at the origin storage location.

The overlapping property may also lead to different access times for reading data from the different physical regions 11 and 12. In the first physical region 11 with the insertion/overwriting write mode being applied, a direct access reading of data may be implemented in which the write head may directly be positioned at the location of data to be read which location may be indicated by some mapping table for mapping longitudinal position and data track id to a logical address of data. There is no need to read all data from the beginning of a logical data track until its end for collecting all active data requested. Hence, access time for reading data may differ with respect to the first physical region 11 from access time required for reading data from the second physical region 12, and specifically may be shorter.

In terms of a multi-tier storage concept embodied on a single tape cartridge, it may be preferred that in the first physical region 11 "hot", i.e. frequently accessed data is stored in overwrite mode since a lower average latency is achieved. In the second physical region 12 "cold", i.e. less frequently accessed data may be stored in append mode. In addition, the different physical regions 11 and 12 may apply different error correction codes with respect to enabling error correction of different capability to the user data stored.

As a result to the different writing modes applied to the tape storage medium of FIGS. 3 to 5, the different physical regions may hold different capacities of data. In the present example, the second physical region 12 may be written in a more dense way and result may hold a higher data capacity than the first physical region 11, even if the two physical regions 11 and 12 may have an identical areal extension on the tape storage medium 1.

With respect to FIG. 6, the first and second physical regions 11 and 12 differ in width w1 and w2 of first and second data tracks 71 and 72 and in distances d1, d2 between adjacent first data tracks 71 and adjacent second data tracks 72. In addition, longitudinal extensions l1, l2 of cells 81 and 82 in the respective first and second data tracks 71 and 72 are different. In the first physical region 11, a cell 81 holding a data value is characterized by width w1 and length l1 which product w1*l1 exceeds the product of the w2*l2 for a cell 82 in the second physical region 12 with a second width w2 and a second length l2. In addition, the distance between first data tracks d1 exceeds the distance between second data tracks d2. All these properties lead to an improved signal to noise ratio (SNR) for reading data from the first physical region 11 compared to reading data from the second physical region 12. The cells 81 in the first physical region 11 are larger and laterally more separated than the cells 82 in the second physical region 12.

The various physical regions may or may not have the same servo format for aligning lateral deviations of the tape from the head. The tape drive may use only a single head for reading and writing to all physical regions, or may use multiple heads, preferably one assigned to each physical region.

FIG. 7 illustrates a flow diagram of a method according to an embodiment of the present invention. The method preferably is implemented by a controller of the tape storage system. In step S1 a writing process for writing new user data to a tape storage medium is started. In the present embodiment, it is assumed that the tape storage medium either is preformatted into the required number of physical regions or is already partitioned by the controller such that all information as to the partitioning and the parameters of the different write modes is available, for example, in a memory of the controller. In step S2, it is assumed that a request is received for writing new user data to the tape storage medium. It is assumed that the request not only contains that new data to be written but also some classification assigned to the new data, for example, a classification as to the data integrity that is required in storing or an anticipated access classification into hot or cold data. In step S3, it is determined if such assigned characteristic requires the data to be written to the first physical region or to the second physical region. Subject to the decision in step S3, the new data is written to the first physical region in step S4 in a first write mode, or to the second physical region in step S5 in a second write mode.

In another embodiment, the new data supplied may not be accompanied by such additional information. Then, in step S3 the new data may be evaluated by the controller, for example, with respect to the sort of data provided, its content, the sender, or any other characteristic. Subject to such evaluation, it may be determined into which one of the first and second physical region the new data may be written to by applying the corresponding write mode in step S4 or in step S5.

In step S6, the written new data may be verified, for example, by read-while-write, or by any other measures, and the write procedure may terminate in step S7.

The method illustrated in FIG. 8a) differs from the method of FIG. 7 in that the tape storage medium may need to be partitioned in step S8 prior to being used. The partitioning process is shown in FIG. 8b) and starts in step S81. In step S82 it is determined, how many physical regions shall be arranged on the tape storage medium. In the same step, the position of the various physical regions on the tape storage medium is defined. In step S83, a write mode may be defined and assigned to each physical region, wherein the write modes assigned to at least two physical regions differ from each other in at least one parameter. In step S84, control data and/or metadata as to the physical regions, such as the respective beginning and end and possibly parameters of the associated write mode may be written to the tape storage medium, for example, in a separate control data region, or in one or more guard regions. In this way, the arrangement of physical regions and associated write mode information is available from the tape itself such that the tape and its associated tape cartridge may be readable and writeable in other tape drives, too. In an alternate embodiment, the above information is stored in the controller which may make the present controller and its associated tape storage system be the preferred means for reading and writing the subject tape storage medium. In step S85, the partitioning process terminates. With respect to FIG. 8a) following the partitioning step S8 the tape storage medium is ready to accept user data, and in step S2 a request for storing user data on the partitioned tape may be received and processed in the following steps identical to the process of FIG. 7.

As will be appreciated by one skilled in the art, aspects of the present invention may be embodied as a system, method or computer program product. Accordingly, aspects of the present invention, in particular in form of the controller, may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention, such as the read and write methods, may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:
1. A method for writing data to a tape storage medium comprising:
   writing a first user data to a first physical region of the tape storage medium in a first write mode; and writing a second user data to a second physical region of the tape storage medium in a second write mode:
   wherein the second write mode differs from the first write mode;
   wherein the first write mode writes adjacent first data tracks with a first lateral offset of a write element and the second write mode writes adjacent second data tracks with a second lateral offset of the write element; and
   wherein the first lateral offset is different from the second lateral offset.

2. The method according to claim 1, wherein the second write mode differs from the first write mode so that a data stream to be written to the respective physical region is generated from the respective user data.

3. The method according to claim 1, wherein the second write mode differs from the first write mode so that a data stream generated from the respective user data is written to the respective physical region.

4. The method according to claim 1, wherein
   the first write mode generates first data tracks with a first width on the tape storage medium;
   the second write mode generates second data tracks with a second width on the tape storage medium; and
   the first width is different from the second width.

5. The method according to claim 1, wherein:
   the first write mode writes a new first data track next to an adjacent first data track without overlapping the adjacent first data track; and
   the second write mode writes a new second data track next to an adjacent second data track with the new second data track overlapping the adjacent second data track.

6. The method according to claim 1, wherein:
   the first write mode appends a new first user data to the first user data; and
   the second write mode overwrites the second user data by a new second user data.

7. The method according to claim 1, wherein:
   the first write mode arranges adjacent first data tracks on the tape storage medium at a first lateral distance;
   the second write mode arranges adjacent second data tracks on the tape storage medium at a second lateral distance; and
   the first lateral distance is different from the second lateral distance.

8. The method according to claim 1, wherein:
   the first write mode writes a logical value of the first user data by applying a write pulse with a first length;
   the second write mode writes a logical value of the second user data by applying a write pulse with a second length; and
   the first length is different from the second length.

9. The method according to claim 1, wherein:
   in the first write mode, at least one of: a modulation, compression, encryption, run-length limited coding, and error correction coding, is applied for generating a data stream to be written to the first physical region from the first user data; and
   the at least one of: modulation, compression, encryption, run-length limited coding, and error correction coding, is different from a respective modulation, compression, encryption, run-length limited coding, and error correction coding, applied for generating a data stream to be written to the second physical region from the second user data.

10. A non-transitory computer readable storage medium tangibly embodying a computer readable program code having computer readable instructions which, when executed, causes a computer device to carry out the steps of a method for writing data to a tape storage medium, the method comprising:
   writing a first user data to a first physical region of the tape storage medium in a first write mode; and
   writing a second user data to a second physical region of the tape storage medium in a second write mode:
   wherein the second write mode differs from the first write mode;
   wherein the first write mode writes adjacent first data tracks with a first lateral offset of a write element and the second write mode writes adjacent second data tracks with a second lateral offset of the write element; and
   wherein the first lateral offset is different from the second lateral offset.

11. The non-transitory computer readable storage medium according to claim 10, wherein:
   the first write mode writes a new first data track next to an adjacent first data track without overlapping the adjacent first data track; and
   the second write mode writes a new second data track next to an adjacent second data track with the new second data track overlapping the adjacent second data track.

12. The non-transitory computer readable storage medium according to claim 10, wherein:
   the first write mode appends a new first user data to the first user data; and
   the second write mode overwrites the second user data by a new second user data.

13. The non-transitory computer readable storage medium according to claim 10, wherein:
   the first write mode arranges adjacent first data tracks on the tape storage medium at a first lateral distance;
   the second write mode arranges adjacent second data tracks on the tape storage medium at a second lateral distance; and
   the first lateral distance is different from the second lateral distance.

14. The non-transitory computer readable storage medium according to claim 10, wherein:
   the first write mode writes a logical value of the first user data by applying a write pulse with a first length;
   the second write mode writes a logical value of the second user data by applying a write pulse with a second length; and
   the first length is different from the second length.

15. An apparatus for writing data to a tape storage medium, the apparatus comprising:
   a memory;
   a processor communicatively coupled to the memory; and
   a controller communicatively coupled to the memory and the processor, wherein the controller is configured to execute the steps of a method comprising:
   writing a first user data to a first physical region of the tape storage medium in a first write mode; and
   writing a second user data to a second physical region of the tape storage medium in a second write mode:
   wherein the second write mode differs from the first write mode;
   wherein the first write mode writes adjacent first data tracks with a first lateral offset of a write element and the second write mode writes adjacent second data tracks with a second lateral offset of the write element; and
   wherein the first lateral offset is different from the second lateral offset.

16. A tape storage medium, comprising:
a first physical region comprising first data in a first data format; and
a second physical region comprising second data in a second data format:
wherein the second data format differs from the first data format;
wherein said first and second data are written such that a first write mode writes adjacent first data tracks with a first lateral offset of a write element and the second write mode writes adjacent second data tracks with a second lateral offset of the write element; and
wherein the first lateral offset is different from the second lateral offset.

17. The tape storage medium according to claim 16, wherein the second data format differs from the first data format in the way in which a data stream written to the respective physical region is generated from respective user data.

18. The tape storage medium according to claim 16, wherein the second data format differs from the first data format so that a data stream generated from respective user data is written to respective physical region.

19. The tape storage medium according to claim 16, comprising a separator between two adjacent physical regions, wherein the separator is at least one of a guard region, a region header, and a data pad.

20. The tape storage medium according to claim 16, wherein the tape storage medium is within a tape cartridge.

* * * * *